(No Model.)

L. MANGUINE.
LUNCH BUCKET.

No. 504,358. Patented Sept. 5, 1893.

Witnesses
John C. Shaw

Inventor
Louis Manguine
By his Attorneys,
C. A. Snow & Co.

UNITED STATES PATENT OFFICE.

LOUIS MANGUINE, OF COTTAGE GROVE, OREGON.

LUNCH-BUCKET.

SPECIFICATION forming part of Letters Patent No. 504,358, dated September 5, 1893.

Application filed May 23, 1893. Serial No. 475,264. (No model.)

*To all whom it may concern:*

Be it known that I, LOUIS MANGUINE, a citizen of the United States, residing at Cottage Grove, in the county of Lane and State of Oregon, have invented a new and useful Lunch-Bucket, of which the following is a specification.

My invention relates to an improvement in dinner pails or lunch heaters, the objects in view being to provide a compact and serviceable device in which a suitable quantity of solid and liquid food may be carried and at the proper time heated for use; to provide simple and efficient means for preventing contact between and intermixture of the solid and liquid portions of the contents; and to provide suitable means for applying and concentrating heat whereby the contents may be warmed quickly and efficiently.

Further objects and advantages of my invention will appear in the following description, and the novel features thereof will be particularly pointed out in the claims.

Figure 1:
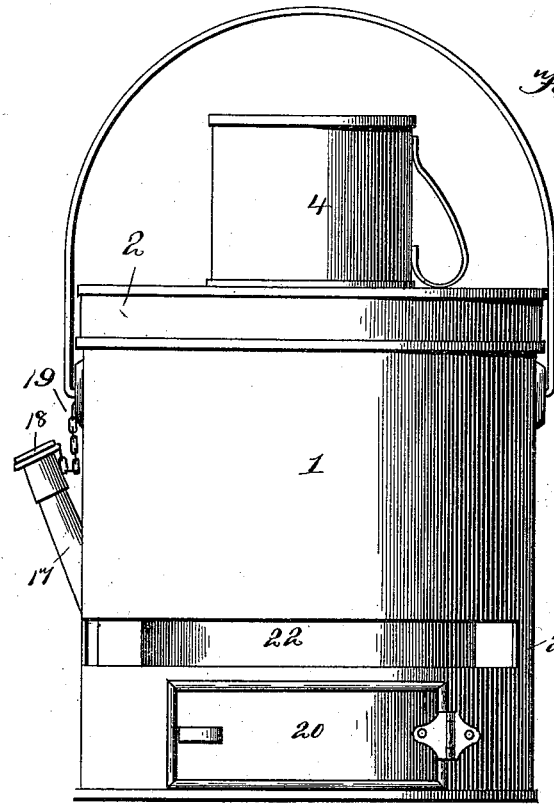
Figure 2:
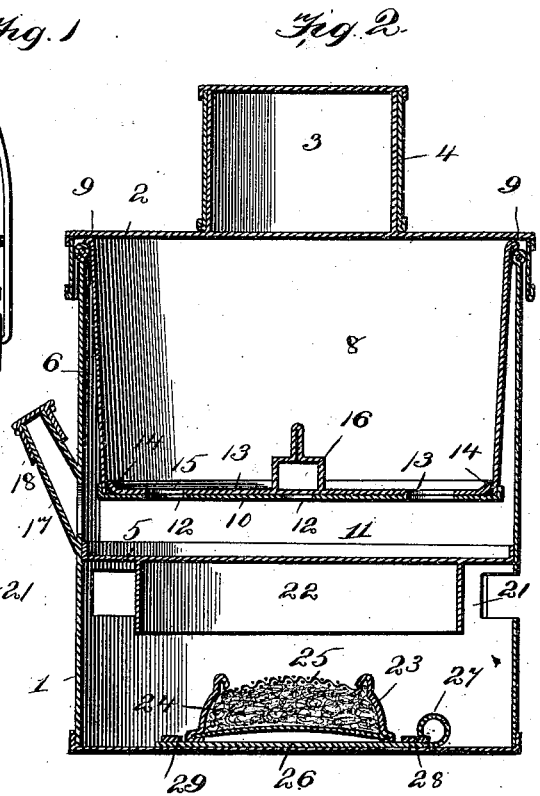
Figure 3:
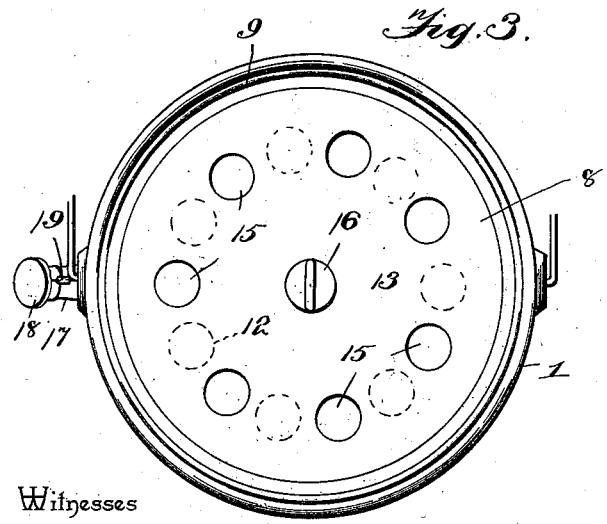
Figure 4:
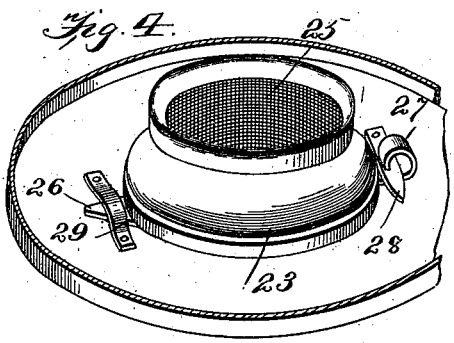

In the drawings—Figure 1 is a side view of a device embodying my invention. Fig. 2 is a vertical central section of the same. Fig. 3 is a plan view with the lid or cover removed showing the rotary slide turned to close the communicating openings between the liquid receptacle and the container for solids. Fig. 4 is a detail view in perspective of the heating device which I preferably employ in connection with my invention.

Similar numerals of reference indicate corresponding parts in all the figures of the drawings.

1 represents the outer casing or pail which is provided with a removable lid or cover 2, upon the top of which is centrally fixed a ring or fruit receptacle 3 over which is adapted to be fitted an ordinary drinking cup 4, the latter forming the cover for said fruit receptacle. The body portion of the pail is divided by means of a horizontal imperforate partition 5 to form the upper food compartment 6 and a subjacent heating chamber 7, and in the top of the upper or food compartment is fitted a removable tray 8, which, in horizontal section, corresponds in size and shape to the interior of the pail and is provided at its upper edge with a rib or thickened portion 9 to engage the upper edge of the pail and thus suspend the tray in its operative position with its bottom 10 separated from the imperforate partition 5 to form a liquid receptacle 11. The bottom of said tray is provided with a series of openings 12 whereby the liquid receptacle communicates with the interior of the tray.

Fitted in the tray and bearing upon the bottom thereof is a rotary slide or cut-off 13 which is provided with a flanged periphery, as shown at 14, and with a series of perforations or openings 15 which correspond in relative position to the openings 12, whereby the openings 15 may be brought into registration with the openings 12 or may be turned to agree with the intervals between the openings 12, whereby the latter are closed.

A finger hold 16 is provided at the center of the rotary slide or cut-off to enable the latter to be adjusted to allow or cut off communication between the portions of the pail containing the liquid and solid food.

A spout 17 communicates with the liquid receptacle to enable the contents of the latter to be removed, and is provided with a stopper or cap 18 which is connected by means of a retaining chain 19 to the pail.

A hinged door or closure 20 is provided in the side of the pail adjacent to its bottom to afford access to the heating chamber which is located beneath the imperforate partition 5, and above the plane of the upper edge of said door or closure is arranged an annular series of vents 21 which also communicate with the heating chamber. Depending from the under side of the imperforate partition 5 and spaced a short distance from the walls or sides of the pail is an annular guard 22, whose lower edge is arranged below the plane of the lower sides of the vents 21.

23 represents a heating device which I prefer to employ in connection with my improved lunch bucket, the same being in the form of a lamp and being filled with an absorbent or fibrous material 24, such as asbestus, and covered by a wire gauze or reticulated fabric 25. To the bottom of this heating device is affixed a diametrically-disposed strap 26 which projects at its extremities beyond the sides of the body of the heating device, one end being turned up to form a handle 27. To the bottom of the pail are affixed, respectively, a keeper 28 to receive the free extremity of the strap 26 and a spring tongue 29 to engage the other end of the said strap whereby the heating device is held firmly in place. This being the construction of my improved lunch bucket, the operation thereof will be readily understood. Briefly, the rotary slide or cut-off is turned to prevent communication between the liquid receptacle and the tray to prevent splashing of the contents of the former into the tray while the pail is being carried or during the time that the workman is going to work. When the proper time arrives for heating the lunch the fuel in the lamp or heater is ignited, those portions of the solid food which do not need heating are removed from the tray and the rotary slide or cut-off is turned to cause the openings therein to register with the openings in the bottom of the tray. The heat generated in the heating chamber is held from dissipation by the annular guard, while at the same time the vents in the sides of said chamber provide the necessary ventilation and draft to support combustion.

It will be understood that the depending annular guard prevents violent drafts of wind, when the device is used in the open air, from extinguishing the flame.

Having described my invention, what I claim is—

1. In a lunch bucket, the combination of a containing pail provided in its sides adjacent to its bottom with vents, and having a removable lid or cover, a horizontally-disposed imperforate partition arranged in the pail to form a superjacent food compartment and a subjacent heating chamber, a removable tray fitting in the upper portion of said compartment with its bottom spaced from the said partition to form a liquid receptacle, said bottom being provided with perforations, means to close said perforations, an annular guard depending from the under surface of said partition adjacent to the vents in the sides of the pail and terminating at its lower edge below the lower sides of said vents, and a heating device fixed in the heating chamber beneath the center of the partition, substantially as specified.

2. In a lunch bucket, the combination of a containing pail provided with a removable lid or cover, and an intermediate horizontally-disposed imperforate partition forming a superjacent food compartment and a subjacent heating chamber, said heating chamber being provided with suitable vents, a heating device arranged in said heating chamber, a removable tray fitted in the top of the food compartment and having a perforated bottom which is spaced from said imperforate partition to form a liquid receptacle, and a rotary slide or cut-off fitted in the tray, resting upon the bottom thereof and provided with perforations to agree with the perforations in the said bottom, and means whereby the slide or cut-off may be rotated, substantially as specified.

3. In a lunch bucket, the combination of a containing pail provided at its top with a removable lid or cover bearing an annular ring or fruit compartment and also provided near its bottom with a hinged door or closure and an adjacent annular series of vents, a horizontal imperforate partition arranged in the pail to divide the interior thereof to form a food compartment and a subjacent heating chamber, a guard flange depending from said partition, a tray fitted in the top of the food compartment and forming a solid food receptacle and a liquid food receptacle, and a heating device provided with a diametrically-disposed strap to engage a keeper and a spring tongue fixed to the bottom of the pail, substantially as specified.

4. In a lunch bucket, the combination with a containing pail provided with a suitable lid or cover, and having an intermediate horizontal partition forming a superjacent food compartment and a subjacent heating chamber, the walls of the latter being provided with suitable vents, of a heating device having a filling of fibrous material and provided with a covering of wire gauze or reticulated fabric, a keeper and a spring tongue fixed to the bottom of the pail, and a strap secured diametrically to the under side of the heating device and having a free extremity to engage said keeper, and a turned up opposite extremity to engage said spring tongue and form a handle for the heating device, substantially as specified.

In testimony that I claim the foregoing as my own I have hereto affixed my signature in the presence of two witnesses.

LOUIS MANGUINE.

Witnesses:
J. A. BENSON,
W. P. LOCKWOOD.